Figure 1:
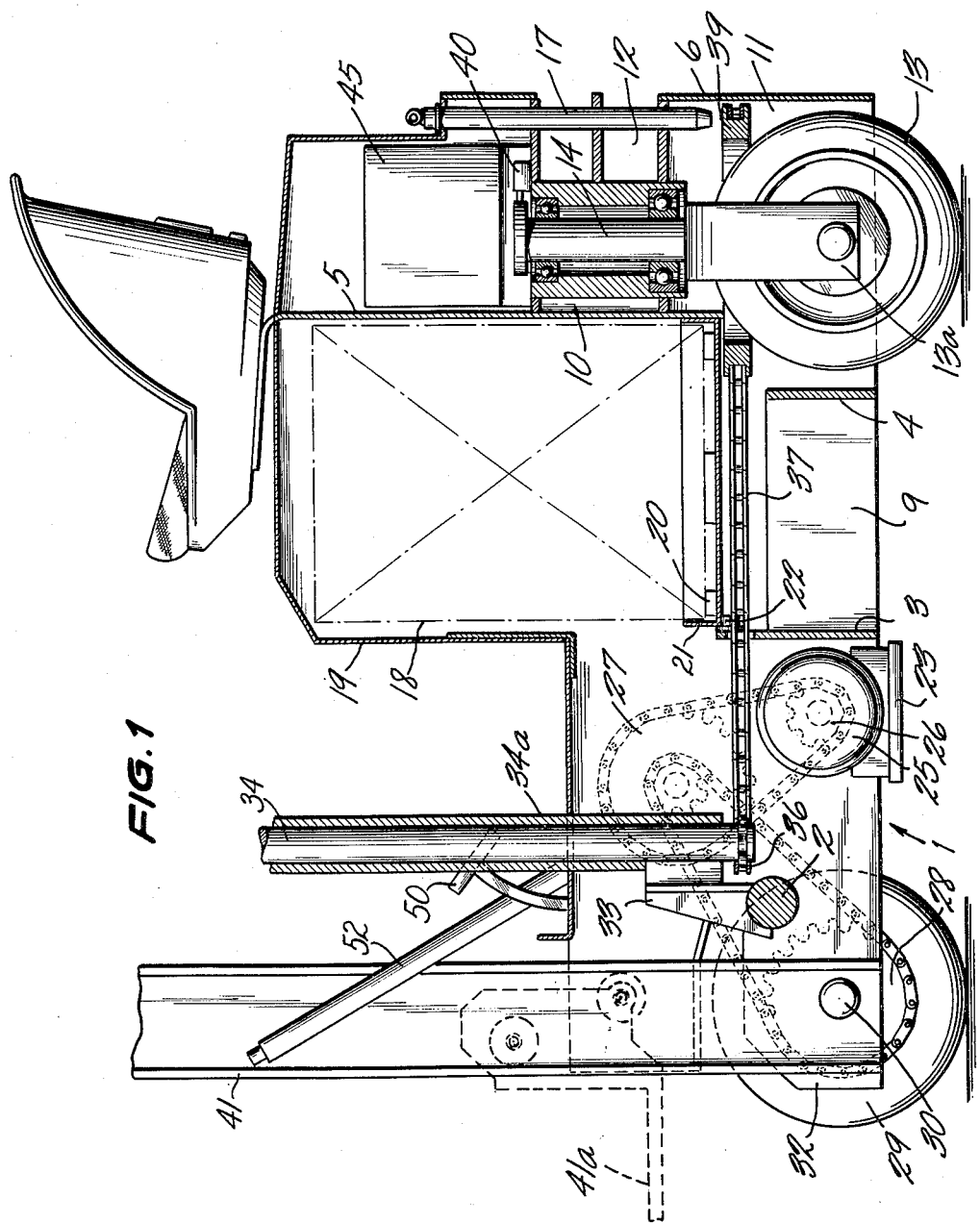

Oct. 10, 1961 J. LOEF ET AL 3,003,586
VEHICLE
Filed Aug. 28, 1959 2 Sheets-Sheet 1

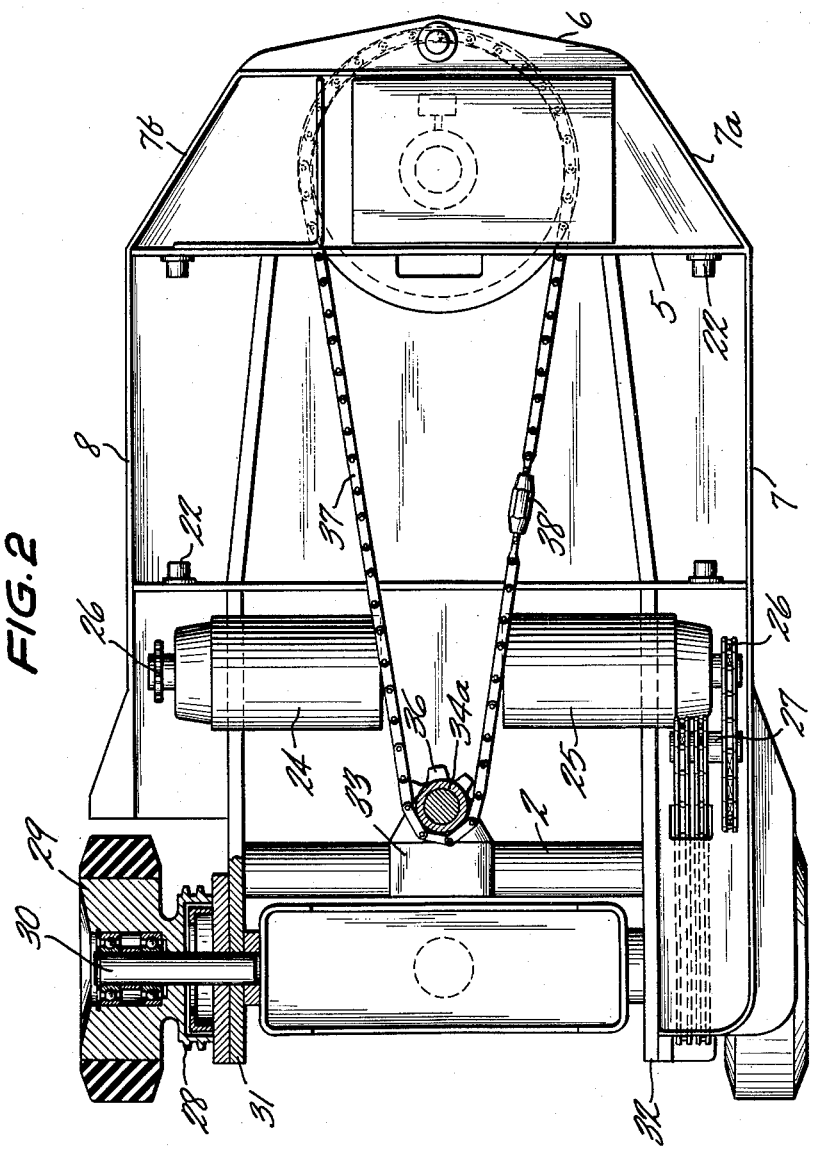

United States Patent Office 3,003,586
Patented Oct. 10, 1961

3,003,586
VEHICLE
Jakob Loef, Adolf Paul, and Kurt Steinert, Moosburg, Germany, assignors to Firma Steinbock G.m.b.H., Moosburg, Germany, a German company
Filed Aug. 28, 1959, Ser. No. 836,669
Claims priority, application Germany Aug. 28, 1958
7 Claims. (Cl. 187—9)

This invention relates to a lifting and conveying vehicle of the type having a lifting fork at its forward end adapted to lift and stack various articles such as loaded pallets, and the like.

Forked lifting and conveying vehicles have been known for many years and have appeared on the market in various forms. These vehicles may be divided, in their classical or standard forms, into those which operate with a fixed-axle wheel drive, a differential gear, and an electric motor connected in series with it, those using internal-combustion propulsion, and comprising a differential gear, gear-shift, coupling and an internal combustion motor, and those involving a small stacking vehicle which are powered through the steerable wheel rather than through the fixed-axle wheels. There are also, however, small stacking vehicles which are powered through the fixed-axle wheels.

It is an object of the present invention to provide an improved lifting and conveying vehicle of the character indcated which is adapted to be embodied as a compact, relatively small vehicle adapted to be manufactured economically and at low cost, having increased versatility and reduced weight but nevertheless being capable of standing up under heavy-duty operation.

It is an object of the invention not only to improve the construction of known small vehicles of this character, which are electrically powered through fixed-axle wheels by means of electric motors, but to provide a vehicle of the character indicated having a new and useful structural combination.

In accordance with the present invention, the vehicle has a twin motor drive but it does not comprise only a single factor, such as the improved twin-motor drive, but also comprises the combination of such a power unit with a plurality of other structural features which, in combination, provide a vehicle in accordance with the foregoing objects.

In the vehicle of this invention, counter-weights are distributed over the entire framework, or chassis, of the vehicle. However, in itself, even this measure would not be sufficient to achieve the objects of the invention if, at the same time, these weights were not provided inexpensively as a result of the fact that they are defined by a mixture of scrap-iron and concrete, and, in some cases, of barium-sulphate-concrete. In the vehicle of the invention the space within the body which is not occupied by the battery and the moving parts of the vehicle is used to stabilize the vehicle by being filled with this concrete-scrap-iron mixture, so that a considerable part of the weight of the vehicle provides a very low center of gravity, which is particularly favorable for the transverse stability of the vehicle.

It would however not be possible to distribute the weight in this manner and to place the battery directly over it if, at the same time, the steering of the vehicle were not harmonized with this arrangement. Thus, steering is effected by means of a horizontally-disposed steering-ring and a wholly horizontal chain extending to a sprocket wheel at the lower end of the steering column actuated by the operator of the vehicle.

Finally, the battery is positioned in such manner that it provides a particularly low center of gravity and makes possible an especially short vehicle construction. This results from the fact that the battery is positioned, not as in usual constructions, over the steering-axle, i.e. the axle of the steerable wheel, but ahead of the steering-axle, or between it and the fixed wheels.

According to the invention, the space thus left free above the steerable wheel is used to accommodate the hydraulic pump, its driving motor and its oil tank, as well as its switch.

As a further aspect of the vehicle of the invention there is provided a substantial ratio between the steering column and the steerable wheel, with the elimination of a steering-gear, with a resultant over-all simplification in the steering of the vehicle.

The invention will now be more fully described in relation to a specific embodiment thereof illustrated in the accompanying drawing, wherein:

FIG. 1 is a longitudinal vertical sectional view, partly in elevation, of a vehicle embodying features of the present invention; and FIG. 2 is a top plan view of the vehicle, with portions removed and some portions in cross-section in order to show details of construction.

Referring to the drawings, the forked lifting and conveying vehicle illustrated comprises a chassis 1 with cross-members 2, 3, 4, 5 and 6, and longitudinal side walls 7 and 8, which merge with tapering or oblique walls 7a and 7b. The aforementioned cross-members and walls define compartments 9, 10, 11 and 12. Sufficient stability for the vehicle and a low center of gravity, combined with a low cost are achieved by filling the compartments 9 and 10 with a mixture of concrete and scrap metal, the concrete suitably consisting entirely of, or at least in part of, barium-sulphate-concrete (not shown), as shown in Loef copending application Serial No. 793,309, filed February 16, 1959.

Between the transverse walls 5 and 6 is positioned the steerable wheel 13 rotatably supported in a fork or bracket 13a carried by the steering axle 14, which is mounted in self-adjusting bearings. The vehicle body also accommodates at the same time a pin or bolt 17 which is adapted to serve as a tow coupling. Between the wall 5 and the transverse partition 3, which have different heights, there is disposed a casing 19 suitably formed from sheet metal and enclosing the storage battery 18 which is supported on resilient shock-absorbers 20 on an angle iron frame 21 carried by rollers 22, by means of which the battery can be moved laterally in and out of the casing which suitably has a side opening. In front of the wall 3, the twin drive motors 24 and 25 are supported on base plate 23. At their outer ends, the motors carry sprocket-wheels 26 which are connected by means of chains to the transmission-gear 27, and from there to the brake-drums 28 which are suitably provided with chain-engaging teeth. These brake-drums are integrally connected with rubber-tired wheels 29 which are rotatably mounted on stub axles 30 carried in arms 31 and 32 of the chassis 1. The cross-truss 2, which is suitably in the form of a rod, extends between arms 31 and 32. Carried by cross-truss 2 is a bracket 33 which supports the steering column 34 by means of a column bearing sleeve 34a. The lower end of the steering column 34 carries a sprocket-wheel 36 on which is trained a chain 37, with its ends connected by a turn-buckle 38, which also passes around a steering ring 39 which turns the steerable wheel 13 by rotating the steering axle 14.

It will be seen that the disposition of the battery in the casing 18 and the compartments 9, 10, 11 and 12, are all in harmony with the steering arrangement comprising the members 36, 37 and 39. No known steering arrangement could be accommodated in the space between the battery and the counter-weight that it disposed in the compartment 9. A different steering arrangement would require either a raising of the battery or elimination of the counter-weight, thereby nullifying some of the advantages of the vehicle construction of the present invention.

As indicated at 40, there is provided a switch which is the nature of a limit switch to cut off the current to one or the other of the twin-motors 24 and 25 upon rotation of axle 14 a predetermined distance in one or the other direction, to facilitate steering and reduce the steering radius. The same switch or a different switch may also be connected to slow down the motor drive to its lowest step automatically when curves are undertaken. Thus, the motors can be of variable speed drive or a variable speed gear may be disposed between the motors and the driven wheels.

As will be seen in FIG. 1, a column 41 for the lifting fork is disposed in the forward part of the vehicle and, in order to lower the center of gravity as much as possible, the column 41 extends downwardly between the stub axles 30. The stub axles are used rather than a continuous axle in order thus to accommodate the column 41. Brackets 42 connect the column 41 to the arms 31 and 32. The lifting fork is shown diagrammatically at 41a and may be of any conventional form and mounted in conventional manner in column 41. In the embodiment shown, the fork is mounted on a carriage provided with rollers which engage the inner surfaces of the column 41.

Operation of the lifting fork is suitably effected by the operator of the vehicle by use of a suitable valve (not shown). Interiorly, the column 41 is provided with any convenient means (not shown) of known type for raising and lowering the fork 41a. These means may take the form, for example, of pulleys or gears which may be actuated mechanically as by a motor, or which may be actuated manually as by means of a lever or crank or which may be actuated hydraulically as by a hydraulic pump and reservoir system indicated generally at 45. Typical systems for moving the fork are shown for example in U.S. Patents 2,764,449 and 2,772,800. While the column 41 is shown as a unitary element, it may be formed from telescoping parts as shown in Kurt Steinert application entitled "Telescopic Lifting Unit" and filed concurrently herewith, Serial No. 836,727.

The driving motors are conveniently controlled by means of the pedal 50 and the brake is suitably actuated by the lever 52. The electrical connections with the motors and with the switch 40 have not been shown since they are of conventional form and similarly the connections to the brake, which are also of conventional form, have not been shown.

It will be understood that various changes and modifications may be made without departing from the scope of the appended claims and it is intended, therefore, that all matter contained in the foregoing description and in the drawings shall be interpreted as illustrative only and not as limitative of the invention.

What we claim and desire to secure by Letters Patent is:

1. A forked lifting and conveying vehicle comprising, in combination, a chassis, a pair of fixed-axle forward wheels mounted in said chassis, a steerable rear wheel mounted in a fork on a vertical axis, a lifting column extending vertically between said forward wheels, a lift fork movable in the lifting column, a pair of electric motors each connected to drive one of the forward wheels, a battery for supplying power to said motors and disposed in said chassis between the steerable wheel and the forward wheels, a compartment filled with counter-weight means disposed in said chassis below said battery, steering means for said steerable wheel comprising a steering ring acting upon said fork, a steering column, and a chain connecting said steering column with said ring, said chain and said ring underlying said battery and overlying said compartment filled with counter-weight means.

2. A forked lifting and conveying vehicle as defined in claim 1, wherein drive from said motors to the respective front wheels is effected through a mechanical drive.

3. A forked lifting and conveying vehicle as defined in claim 1, wherein the driving connection between said motors and the respective front wheels is effected through the brake dums of the wheels which are integral with said wheels.

4. A forked lifting and conveying vehicle as defined in claim 1, wherein said forward wheels are mounted upon stub shafts and said column is disposed between said shafts.

5. A forked lifting and conveying vehicle as defined in claim 1, wherein said battery is disposed in a casing carried in said chassis and is supported on a slidable bracket whereby said battery may be moved laterally in relation to said casing.

6. A forked lifting and conveying vehicle comprising, in combination, a chassis, a pair of fixed-axle forward wheels mounted in said chassis, a steerable rear wheel supported by said chassis, a pair of electric motors each connected to drive one of the forward wheels, a battery for supplying power to said motors and disposed in said chassis between the steerable wheel and the forward wheels, a compartment filled with counterweight means disposed in the lower portion of said chassis, and steering means for said steerable wheel, said steering means comprising a steering ring connected to act upon said wheel, a steering column, and a chain connecting said steering column with said steering ring, said chain and said ring underlying said battery and overlying said compartment filled with counterweight means.

7. A vehicle as defined in claim 6, further comprising second compartments disposed on both sides of said steerable rear wheel and a third compartment disposed above said steerable rear wheel, said second and third compartments being filled with counterweight means.

References Cited in the file of this patent

UNITED STATES PATENTS

| | | |
|---|---|---|
| 2,362,129 | Gfrorer | Nov. 7, 1944 |
| 2,571,180 | Ball et al. | Oct. 16, 1951 |
| 2,677,432 | Ronning | May 4, 1954 |
| 2,732,022 | Lapsley et al. | Jan. 24, 1956 |
| 2,875,842 | Morrell | Mar. 3, 1959 |